US009026926B2

(12) United States Patent  (10) Patent No.: US 9,026,926 B2
Kano et al.  (45) Date of Patent: May 5, 2015

(54) INFORMATION PROCESSING APPARATUS, INFORMATION PROCESSING METHOD, AND PROGRAM

(75) Inventors: Ritsuko Kano, Tokyo (JP); Yoshihito Ohki, Tokyo (JP); Akihiro Komori, Tokyo (JP); Reiko Miyazaki, Tokyo (JP)

(73) Assignee: Sony Corporation, Tokyo (JP)

( * ) Notice: Subject to any disclaimer, the term of this patent is extended or adjusted under 35 U.S.C. 154(b) by 586 days.

(21) Appl. No.: 13/248,058

(22) Filed: Sep. 29, 2011

(65) Prior Publication Data

US 2012/0089932 A1  Apr. 12, 2012

(30) Foreign Application Priority Data

Oct. 8, 2010  (JP) ................ P2010-228380

(51) Int. Cl.
G06F 3/048  (2013.01)
G06F 3/0481  (2013.01)

(52) U.S. Cl.
CPC ........ *G06F 3/04812* (2013.01); *G06F 3/04817* (2013.01)

(58) Field of Classification Search
CPC .................. G06F 3/04812; G06F 3/04817
USPC ............ 715/764, 765, 751; 709/224
See application file for complete search history.

(56) References Cited

U.S. PATENT DOCUMENTS

| 7,124,123 | B1* | 10/2006 | Roskind et al. ................ 706/60 |
| 7,375,730 | B2* | 5/2008 | Tagliabue et al. ............ 345/581 |
| 7,703,041 | B2* | 4/2010 | Ito et al. ........................ 715/804 |
| 7,797,293 | B2* | 9/2010 | Pabla et al. ................... 707/705 |
| 8,199,996 | B2* | 6/2012 | Hughes ......................... 382/132 |
| 8,345,843 | B2* | 1/2013 | Lidstrom et al. ......... 379/142.06 |
| 8,447,563 | B2* | 5/2013 | Brown .......................... 702/181 |
| 8,473,847 | B2* | 6/2013 | Glover .......................... 715/730 |
| 8,583,263 | B2* | 11/2013 | Hoffberg et al. ................ 700/17 |
| 2009/0228828 | A1* | 9/2009 | Beatty et al. ................ 715/786 |
| 2010/0115455 | A1* | 5/2010 | Kim .............................. 715/781 |
| 2010/0138782 | A1* | 6/2010 | Rainisto ....................... 715/808 |
| 2011/0016390 | A1* | 1/2011 | Oh et al. ....................... 715/702 |
| 2013/0174100 | A1* | 7/2013 | Seymour et al. ............. 715/863 |
| 2014/0289660 | A1* | 9/2014 | Min .............................. 715/765 |
| 2014/0298261 | A1* | 10/2014 | Imoto et al. .................. 715/810 |
| 2014/0359528 | A1* | 12/2014 | Murata ......................... 715/833 |

\* cited by examiner

*Primary Examiner* — David Phantana Angkool
(74) *Attorney, Agent, or Firm* — Sherr & Jiang, PLLC

(57) ABSTRACT

An apparatus is provided that comprises a first detection unit configured to detect a first user operation on a first object and a first display unit configured to generate signals to display the first object in a first display state. The apparatus further comprises a second display unit configured to generate signals to change the display state of the first object from the first display state to a second display state. The apparatus further comprises a third display unit configured to generate signals to change the display state of the first object from the second display state to the first display state in response to the detection of the second user operation on the first object.

20 Claims, 12 Drawing Sheets

INFORMATION PROCESSING APPARATUS, INFORMATION PROCESSING METHOD, AND PROGRAM

BACKGROUND

The present disclosure relates to an information processing apparatus that manages contents by, for example, images such as icons, and to an information processing method and a program in the information processing apparatus.

In recent years, along with increase in storage capacity of a storage apparatus, the number of contents such as applications and files capable of being stored in an information processing apparatus is increasing. When a user searches for content from such a huge amount of content, means for distinguishing frequently accessed content from the other content can reduce an operational burden on the user.

As one of the means described above, there exists software having functions of managing an access history to a content (activation operation history) and displaying contents frequently used in the higher order of a list and contents less frequently used in the lower order of the list, for example, to thereby improve accessibility to contents.

Further, Japanese Patent Application Laid-open No. 2009-25905 (hereinafter, referred to as Patent Document 1) discloses an information processing apparatus capable of displaying an icon so as to stand out from other icons by increasing or decreasing luminance or contrast of the icon selected from a plurality of icons.

Furthermore, there is also a technique of applying an expression of paper becoming old to an icon in accordance with a low access frequency, as a technique of expressing a secular change of a file or the like.

SUMMARY

In the method of displaying the contents frequently used in the higher order, the accessibility to the contents frequently used may result but contents that the user wants to use sometimes are still difficult to be found in such a display. Therefore, the user has to perform search or the like with use of, for example, character strings input by him/herself, which increases an operational burden on the user.

Further, even with the technique disclosed in Patent Document 1, icons less frequently accessed are still difficult to be found as in the above case. To cause such icons to stand out, it is necessary to select the icons to access contents.

In addition, also in the technique using the expression of paper becoming old, in order to return the icon that has become old once to the original state, it is necessary to select the icon to access a content. Access to contents for the purpose of merely leaving the icons in the original state imposes the user to perform unnecessary operations, which significantly impairs convenience.

In view of the circumstances described above, it is desirable to provide an information processing apparatus, an information processing method, and a program that are capable of changing, in accordance with a frequency of content activation operations, images for the content activation operations so as to be distinguished with ease and canceling at least a part of the change with ease.

In one exemplary embodiment, the present disclosure is directed towards an apparatus comprising a first detection unit configured to detect a first user operation on a first object. The apparatus also comprises a first display unit configured to generate signals to display the first object in a first display state when the first user operation is detected on the first object and a second display unit configured to generate signals to change the display state of the first object from the first display state to a second display state at a first amount of time after the first user operation is detected on the first object, the second display state comprising a visual indication of the elapse of the first amount of time. The apparatus further comprises a second detection unit configured to detect a second user operation on the first object, the second user operation being different from the first user operation. The apparatus further comprises a third display unit configured to generate signals to change the display state of the first object from the second display state to the first display state in response to the detection of the second user operation on the first object.

In another exemplary embodiment, the present disclosure is directed towards method comprising displaying a first object in a first display state when the displayed first object is subjected to a first user operation on the first object. The method further comprises changing the display state of the first object from the first display state to a second display state at a first amount of time after the first user operation, the second display state comprising a visual indication of the elapse of the first amount of time. The method further comprises changing the display state of the object from the second display state to the first display state in response to a second user operation on the first object different from the first user operation.

In yet another exemplary embodiment, the present disclosure is directed towards a tangibly embodied non-transitory computer-readable medium storing instructions which, when executed by a processor, perform a method comprising displaying a first object in a first display state when the displayed first object is subjected to a first user operation on the first object. The method further comprises changing the display state of the first object from the first display state to a second display state at a first amount of time after the first user operation, the second display state comprising a visual indication of the elapse of the first amount of time. The method further comprises changing the display state of the object from the second display state to the first display state in response to a second user operation on the first object different from the first user operation.

As described above, according to the embodiments of the present disclosure, it is possible to change, in accordance with a frequency of content activation operations, images for the content activation operations so as to be distinguished with ease and cancel at least a part of the change with ease.

These and other objects, features and advantages of the present disclosure will become more apparent in light of the following detailed description of best mode embodiments thereof, as illustrated in the accompanying drawings.

DETAILED DESCRIPTION OF EMBODIMENTS

Hereinafter, embodiments of the present disclosure will be described with reference to the drawings.

First Embodiment

A first embodiment of the present disclosure will be described.

Outer Appearance of Information Processing Terminal

Figure 1:
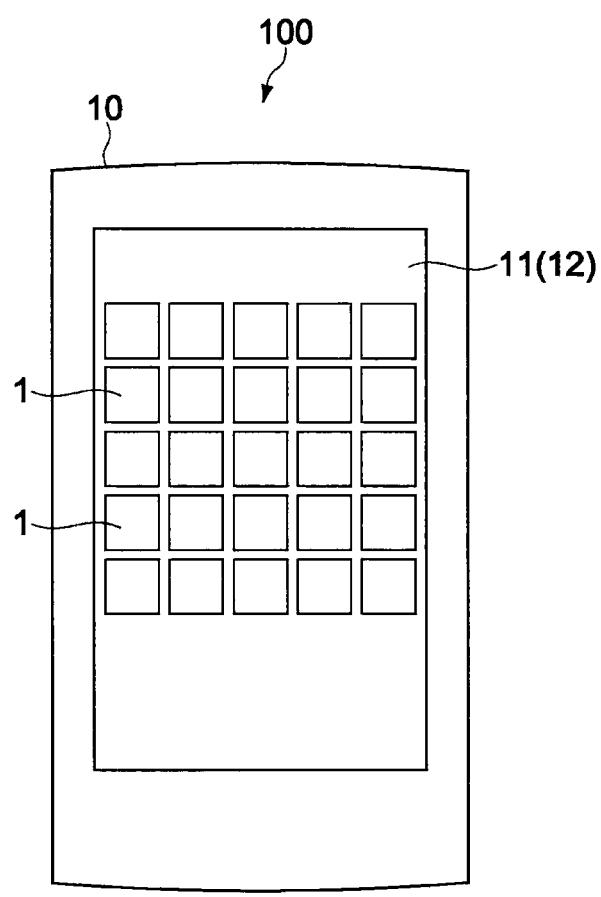
FIG. 1 is a front view showing an outer appearance of an information processing terminal according to a first embodiment of the present disclosure.

FIG. 1 is a front view showing an information processing terminal (smartphone) 100 according to this embodiment.

As shown in FIG. 1, the information processing terminal 100 has a casing 10 having a size and a shape that can be held with one hand of a user, for example. A display 11 is arranged inside the casing 10. A touch panel 12 that detects a contact position of a user's finger, a stylus, or the like is integrally formed on the display 11. A receiver (not shown) is provided in the vicinity of an upper end portion of the casing 10 on the front side. A mouthpiece (not shown) is provided in the vicinity of a lower end portion of the casing 10 on the front side.

The display 11 is constituted of, for example, a liquid crystal display or an EL (Electro-Luminescence) display. Examples of the touch panel 12 include a resistive touch panel 12 and a capacitive touch panel 12, but the touch panel 12 may have any touch panel system. The touch panel 12 is capable of detecting a position of an operation made by the user, a contact area, a contact pressure, or the like.

On the display 11 (touch panel 12), a plurality of icons 1 (e.g. "objects") as targets of activation operation of contents such as files and applications are displayed as an initial menu screen, for example. A user can select a desired icon 1 from the plurality of icons 1 to open a desired file or execute an application.

Configuration of Information Processing Terminal

Figure 2:
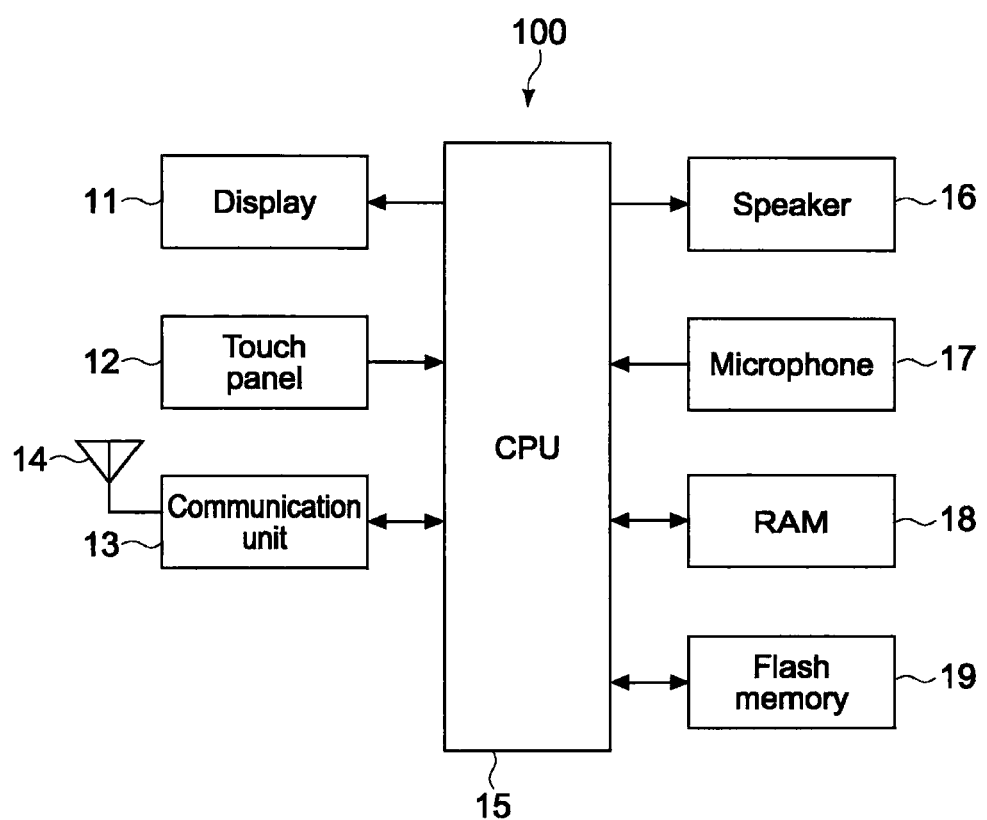
FIG. 2 is a block diagram showing an electrical configuration of the information processing terminal according to the first embodiment of the present disclosure.

FIG. 2 is a block diagram showing an electrical configuration of the information processing terminal 100. As shown in FIG. 2, the information processing terminal 100 includes, in addition to the display 11 and touch panel 12 described above, a communication unit 13, an antenna 14, a CPU (Central Processing Unit) 15, a speaker 16, a microphone 17, a RAM (Random Access Memory) 18, and a flash memory 19. The CPU 15 may include or interact with various other components including display units or detection units.

The communication unit 13 executes processing such as frequency conversion, modulation, and demodulation of radio waves transmitted or received by the antenna 14. The antenna 14 transmits or receives radio waves for call or radio waves for packet communication of e-mails, Web data, or the like.

The speaker 16 includes a D/A (digital/analog) converter, an amplifier, or the like. The speaker 16 executes D/A conversion processing and amplification processing with respect to audio data for call, which is input from the CPU 15, and outputs audio via the receiver (not shown).

The microphone 17 includes an A/D (analog/digital) converter or the like. The microphone 17 converts analog audio data input by a user via the mouthpiece into digital audio data, and outputs the digital audio data to the CPU 15. The digital audio data output to the CPU 15 is encoded and then transmitted via the communication unit 13 and the antenna 14.

The RAM 18 is a volatile memory used as a work area of the CPU 15. The RAM 18 temporarily stores various programs and various types of data used for processing of the CPU 15.

The flash memory 19 is a nonvolatile memory in which various programs and various types of data necessary for the processing of the CPU 15 are stored. The flash memory 19 also stores history information of a content activation operation via the icon 1.

The CPU 15 collectively controls units of the information processing terminal 100, and executes various computations based on various programs. For example, the CPU 15 performs computations based on a value of an operation position input from the touch panel 12, a contact area, or the like and displays the result on the display 11. Further, particularly in this embodiment, the CPU 15 cooperates with a program stored in the flash memory 19 to collectively control processing of giving an expression of a secular change to an icon 1 and processing of canceling the expression of the secular change, as described later.

Operation of Information Processing Terminal

Next, operations of the information processing terminal 100 in this embodiment will be described. In the following description, the CPU 15 of the information processing terminal 100 is an actor of operations, but the operations are also executed in cooperation with other hardware or software shown in FIG. 2.

Processing of Giving Expression of Secular Change

Figure 3:
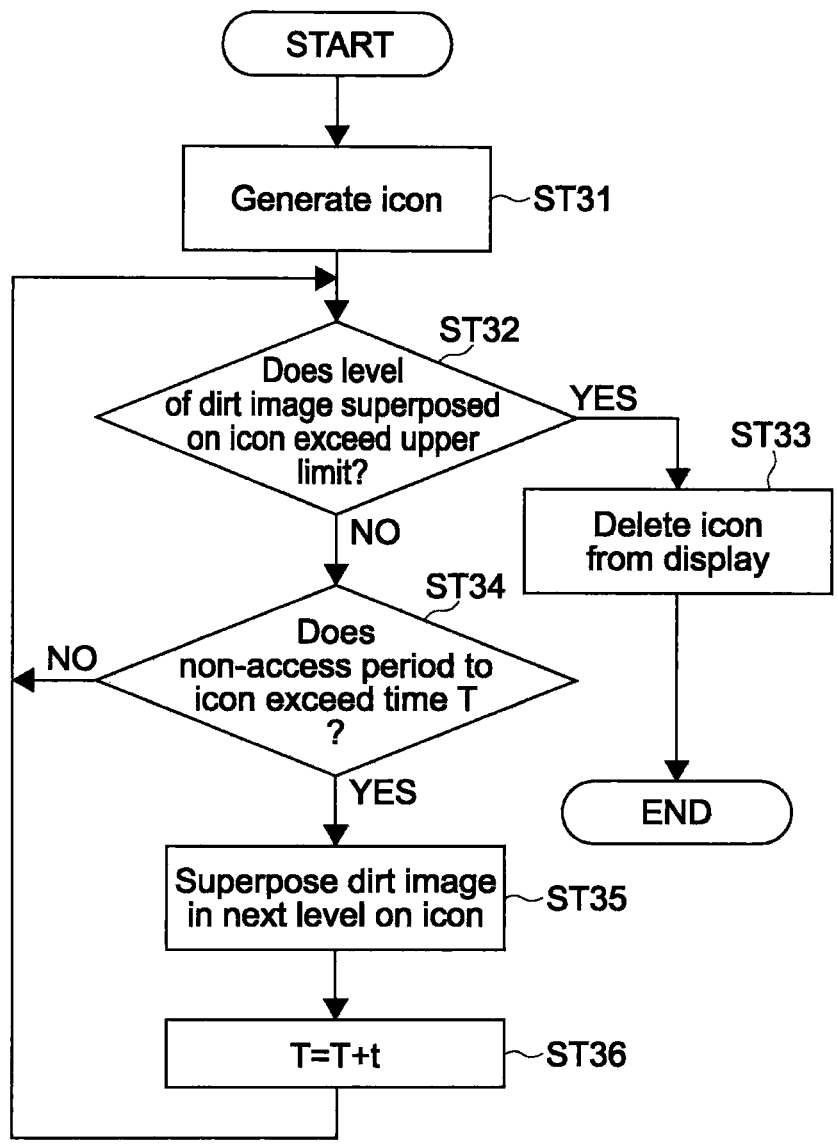
FIG. 3 is a flowchart showing a procedure of processing in which the information processing terminal according to the first embodiment of the present disclosure gives an expression of a secular change to an icon.

FIG. 3 is a flowchart showing a procedure of processing in which the information processing terminal 100 gives an expression of a secular change to an icon 1. In this embodiment, the information processing terminal 100 achieves the expression of the secular change (e.g., change in appearance or display state) as an expression of accumulating dirt (e.g., obscuring, greying, or darkening) on a portion of an icon 1. Specifically, as in the case of a real life in which a user leaves something without using it and then dirt is accumulated thereon, an obscured, greyed or darkened image indicating dirt (hereinafter, referred to as "dirt and для degree of obscuring, graying or darkening as the "level of dirt" or "level of secular change image" is superposed on the icon 1 in accordance with a period of time during which the user does not access the icon 1.

As shown in FIG. 3, the CPU 15 generates an icon 1 when a new content is generated or stored, for example, when a new file is generated or a new application is installed (Step 31).

Subsequently, the CPU 15 determines whether a level of a dirt image superposed on the icon 1 (level of secular change) exceeds an upper limit value (Step 32).

In this embodiment, a plurality of levels are prepared as a degree of a secular change, and dirt images corresponding to the levels are prepared. The dirt images in the respective levels are stored in the flash memory 19, for example. For example, in the case where the number of levels is four, the upper limit value is a fourth level. The upper limit value corresponds to a period of time of, for example, 90 days, 120 days, 180 days, 360 days, or the like. Period of times corresponding to the levels of other dirt images are also set based on the upper limit value at regular intervals, for example. For example, in the case where the number of levels is four and the upper limit value is 120 days, a dirt image in a first level corresponds to 30 days, and that in a second level to 60 days, and that in a third level to 90 days.

In the case where a level of a dirt image does not exceed an upper limit value (No) in Step 32 described above, the CPU 15 determines whether a non-access period to the icon 1 (period of time during which an activation operation for the icon 1 is not input) exceeds a time T based on the stored history information (Step 34).

When determining that the non-access period exceeds the time T (Yes in Step 34), the CPU 15 superposes a dirt image in the next level on the icon 1, in place of the dirt image in the current level (Step 35).

Subsequently, the CPU 15 updates the time T by a time t (T=T+t), and repeats the processing in Step 32 and subsequent steps.

The time T corresponds to a period of time in each level, and the time t corresponds to a period of time of a difference between levels. As described above, for example, in the case where the number of levels is four and the upper limit value is 120 days, t is 30 days.

Then, when determining that the level of the dirt image exceeds the upper limit value (Yes) in Step 32 described above, the CPU 15 deletes the icon 1 from the display 11 (Step 33). The CPU 15 executes the processing described above with respect to each icon displayed on the display 11.

Figure 6:
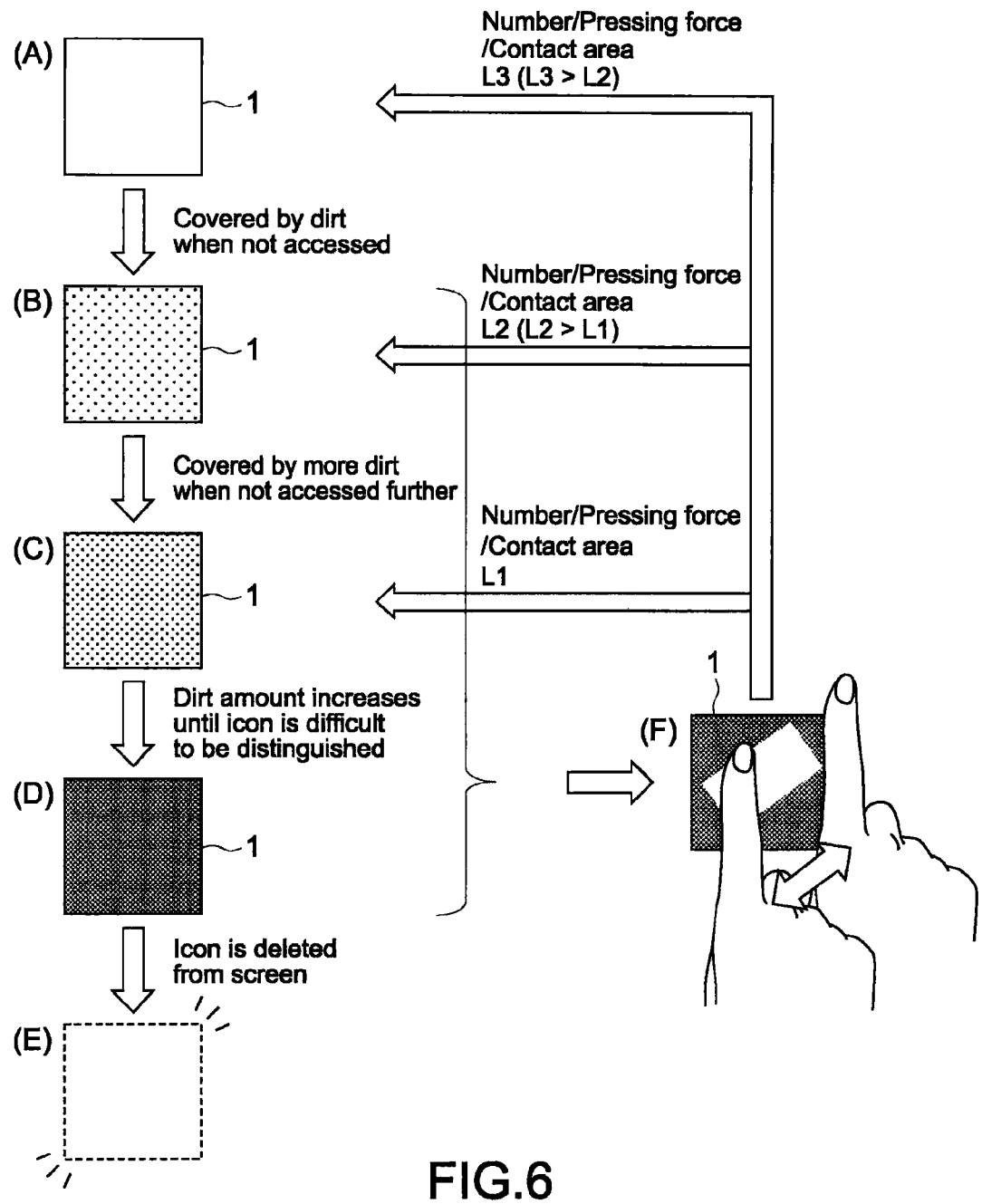
FIG. 6 is a diagram showing a state of a secular change of an icon in the first embodiment of the present disclosure.

FIG. 6 is a diagram showing a state of a secular change of an icon 1 in this embodiment. In FIG. 6, the number of levels of a dirt image is four. As shown in parts (A) to (E) of FIG. 6, dirt is expressed as an aggregate of dots having a color (for example, brown or black) in a dirt image in each level. As a secular change is larger, that is, as a non-access period to an icon 1 is longer, the density of dots in a dirt image to be superposed on the icon 1 is also higher. Every time the non-access period exceeds the time T based on an initial state of the icon 1 shown in part (A) of FIG. 6 (state where a dirt image is not superposed), a dirt image having a high density is superposed on the icon 1 (parts (B) to (D) of FIG. 6). In other words, from the viewpoint of a user, as the non-access period to the icon 1 is longer, more dirt seems to cover the icon 1.

As shown in part (E) of FIG. 6, in the case where the non-access period to the icon 1 exceeds the upper limit value, the icon 1 is deleted. The number of dirt images in different levels (parts (B) to (D) in FIG. 6) prepared in this embodiment is the number obtained by subtracting the number of levels from one. A change in the level may be a change in which the user can grasp a level difference at a glance, or a more linear change that is difficult to be grasped by the user when locally seen. As the change becomes more linear, the number of dirt images to be prepared is increased and the number of updates of the time T is also increased, while the time t is shortened.

In this manner, a secular change of an icon 1 is indicated by superposition of the dirt images. Accordingly, from the viewpoint of the user, dirt seems to be gradually accumulated on an icon 1 that has not been accessed for a long period of time, with the result that a non-access period is intuitively understood.

Processing of Deleting Expression of Secular Change

In this embodiment, as described above, the information processing terminal can delete a dirt image superposed on an icon 1 as an expression of a secular change. There are two cases where a dirt image is deleted. One case is that a user has performed a content activation operation (for example, tap, click, double-tap, double-click or non-click activation command, or combination thereof) via an icon 1, and the other case is that a user has performed a drag operation on an icon 1 (dirt image) without activating a content. Hereinafter, processing of those two cases will be described.

Figure 4:
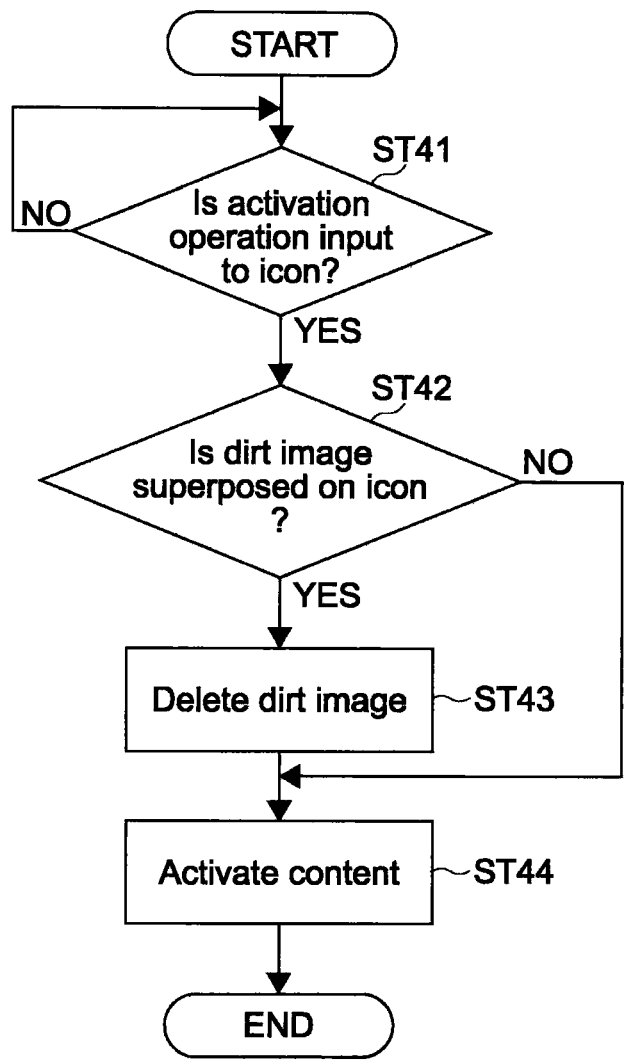
FIG. 4 is a flowchart showing a procedure of processing in which the information processing terminal according to the first embodiment of the present disclosure deletes the expression of the secular change in accordance with a content activation operation via an icon.

FIG. 4 is a flowchart showing a procedure of processing in which the information processing terminal 100 deletes a dirt image in accordance with a content activation operation via an icon 1.

As shown in FIG. 4, the CPU 15 first determines whether an activation operation is input to an icon 1 (Step 41). In the case where the activation operation is input (Yes in Step 41), the CPU 15 determines whether a dirt image is superposed on the icon 1 as a target of the activation operation (Step 42).

In the case where a dirt image is superposed on the icon 1 (Yes in Step 42), the CPU 15 deletes the dirt image (Step 43). Through the processing, the icon 1 returns to the initial state. Specifically, the non-access period is reset and recalculated based on the initial state. Then, the CPU 15 activates a content corresponding to the icon 1 (Step 44). In the case where a dirt image is not superposed on the icon 1 (No in Step 42), the CPU 15 activates a content without performing processing on the icon 1 (Step 44).

Figure 5:
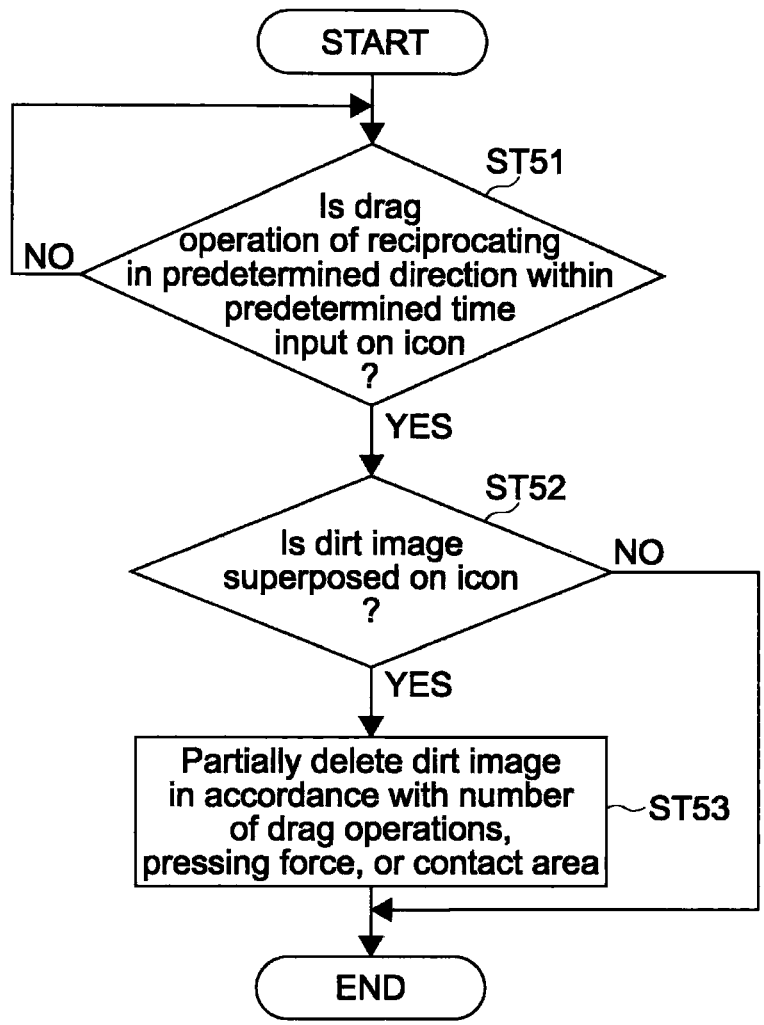
FIG. 5 is a flowchart showing a procedure of processing in which the information processing terminal according to the first embodiment of the present disclosure deletes the expression of the secular change in accordance with a drag operation to the icon.

FIG. 5 is a flowchart showing a procedure of processing in which the information processing terminal 100 deletes a dirt image not in accordance with a content activation operation but in accordance with a drag operation to an icon 1.

As shown in FIG. 5, the CPU 15 first determines whether a drag operation of reciprocating in a direction in a period of time is input on the icon 1 (Step 51). The period of time is, for example, 0.5 seconds, 1 second, 1.5 seconds, or the like, but it is not limited thereto. The direction is an upward, downward, leftward, rightward, oblique, or circumferential direction, or the like, but it is not limited thereto. The drag operation as described above is recognized by the user as an operation of wiping away the dirt covering the icon 1.

In the case where the drag operation is performed (Yes in Step 51), the CPU 15 determines whether a dirt image is superposed on an icon 1 as a target of the drag operation (Step 52).

In the case where a dirt image is superposed on the icon 1 (Yes in Step 52), the CPU 15 acquires a parameter such as the number of reciprocations, a pressing force, or a contact area of the drag operation from the touch panel 12, and deletes an amount of dirt that corresponds to the parameter from the icon 1. Specifically, the CPU 15 changes a level of the dirt image superposed on the icon 1 to a lower level of the dirt image in accordance with the parameter.

FIG. 6 described above also shows a state where an amount of dirt that remains on the icon 1 is changed in accordance with the parameter at a time of the drag operation. As shown in part (F) of FIG. 6, for example, in the case where a dirt image currently superposed has a level shown in part (D) of FIG. 6 and a parameter intensity such as the number of reciprocations, a pressing force, or a contact area of the drag operation is L1, the level of the dirt image is changed to the level shown in part (C) of FIG. 6. Similarly, in the case where the parameter intensity is L2 (L2>L1), the level of the dirt image is changed to the level shown in part (B) of FIG. 6. In the case where the parameter intensity is L3 (L3>L2), the level of the dirt image is changed to the level shown in part (A) of FIG. 6 (initial state). In the case where the level of the dirt image is changed, it is determined whether the level as a reference exceeds the upper limit value for processing of deleting the icon 1.

From the viewpoint of the user, if the dirt covering the icon 1 is wiped away by a light touch operation, a reduced amount of dirt is small, and if the dirt is wiped away by a strong touch operation or is wiped away many times, the reduced amount of dirt is large, with the result that an intuitive operation of wiping away actual dirt is realized.

Here, the CPU 15 does not merely replace the whole of the dirt image in accordance with the parameter intensity. The CPU 15 may further add a touch position at a time of the drag operation to the parameter and replace only a part of the dirt image with another dirt image in a different level. In this case, an area of an icon 1 that serves as a target of the drag operation is changed to a dirt image in a lower level (having lower density of dirt), and other areas remain as they are. Further, even when the whole of the icon 1 is a target to be operated, if a parameter intensity is different depending on areas, the icon 1 is changed to a dirt image having different levels in respective areas in accordance with each parameter intensity.

As described above, the function of deleting a dirt image in a stepwise manner or partially is effective when the user wants to leave a certain icon 1 for a little bit more time, though the certain icon 1 becomes unnecessary sooner or later. In other words, by adjusting the parameter intensity in accordance with a period of time during which the user wants to leave the icon 1, the user can adjust a period of time that elapses before the icon 1 is deleted.

Summary

As described above, according to this embodiment, the information processing terminal 100 expresses the secular change of the icon 1 as a dirt image corresponding to the non-access period to the icon 1, and accordingly can allow the user to easily grasp an icon 1 frequently accessed and other icons 1 based on the level of the dirt image. Further, the information processing terminal can delete the dirt image in accordance with a user's drag operation of wiping away dirt, without activating a content corresponding to the icon 1. In addition, since the deletion can be partially performed in accordance with the parameter intensity in the drag operation, the user can adjust a period of time that elapses before the icon 1 is deleted.

Second Embodiment

Next, a second embodiment of the present disclosure will be described. In the following description, members having the same configurations as those in the first embodiment are denoted by the same reference symbols, and description thereof will be omitted or simplified.

Configuration of Information Processing Terminal

Figure 7:
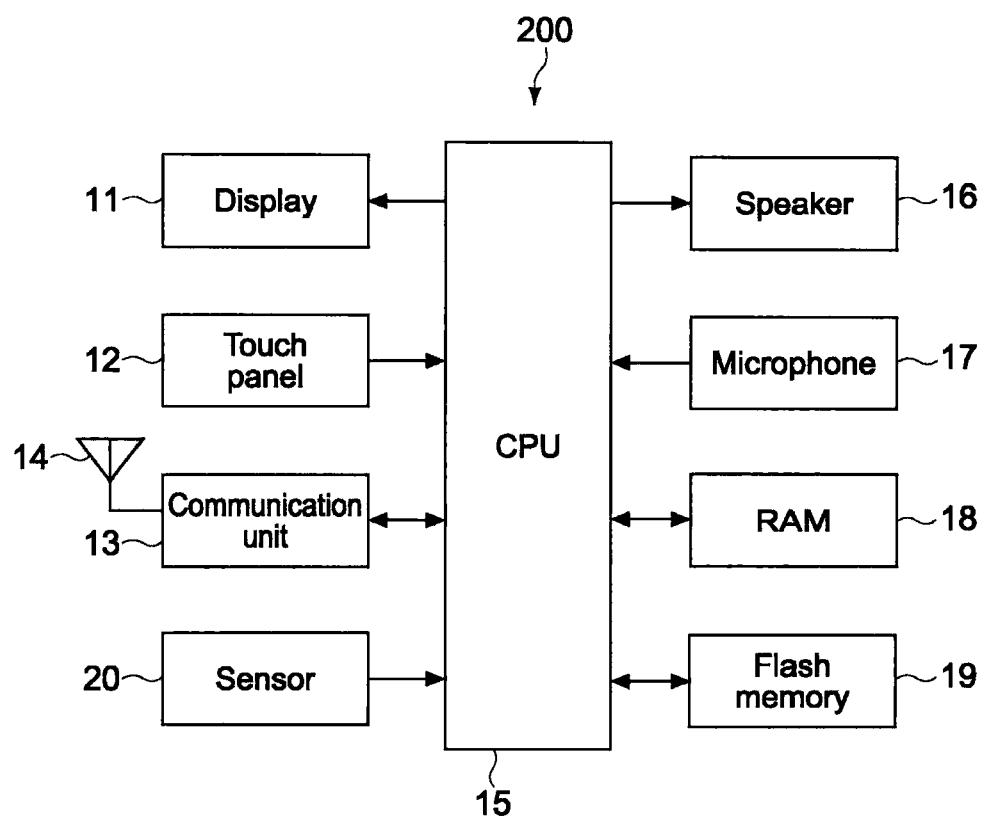
FIG. 7 is a block diagram showing an electrical configuration of an information processing terminal according to a second embodiment of the present disclosure.

FIG. 7 is a block diagram showing an electrical configuration of an information processing terminal (smartphone) 200 according to this embodiment. As shown in FIG. 7, the information processing terminal 200 includes a sensor 20 in addition to the same configuration as that of the information processing terminal 100 according to the first embodiment.

The sensor 20 is a sensor that detects the inclination of the information processing terminal 200 (casing 10). Examples of the sensor 20 include motion sensors such as acceleration sensors (for example, piezo-resistive type, piezoelectric type, and capacitive type), gyroscopes (for example, vibrating gyroscope and rotary top gyroscope), and angular sensors (for example, geomagnetic sensor). The sensor 20 may be a combination of at least two motion sensors exemplified above.

Operation of Information Processing Terminal

Next, operations of the information processing terminal 200 in this embodiment will be described. In the following description, the CPU 15 of the information processing terminal 200 is a main actor of operations, but the operations are also executed in cooperation with other hardware or software shown in FIG. 7.

In the first embodiment described above, a secular change of an icon 1 is expressed as a dirt image. In this embodiment, however, a three-dimensional expression such as a depression of an icon 1 is given to the icon 1 as a secular change thereof. In other words, the information processing terminal 200 executes three-dimensional image processing such as a movement of the icon 1 in a perpendicular direction of a main surface thereof (deep-side direction of display 11) in accordance with a non-access period to the icon 1.

Processing of Giving Expression of Secular Change

Figure 8:
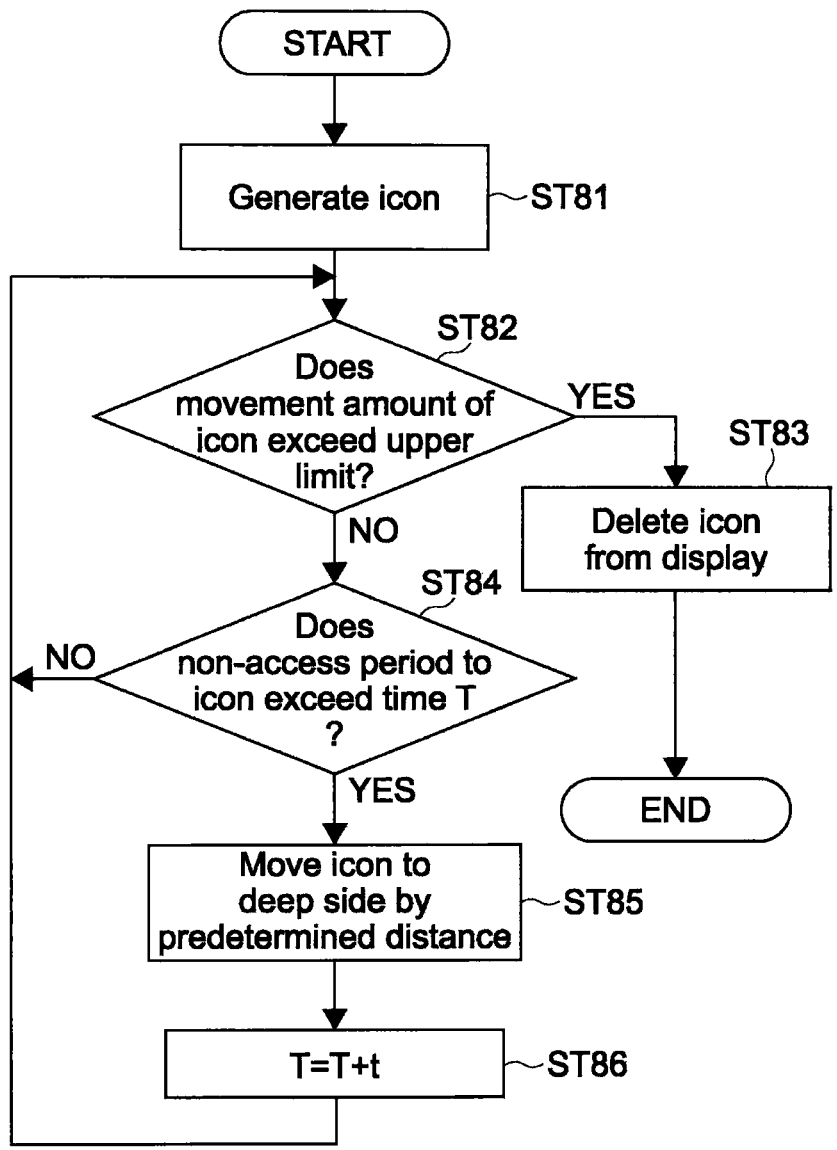
FIG. 8 is a flowchart showing a procedure of processing in which the information processing terminal according to the second embodiment of the present disclosure gives an expression of a secular change to an icon.

FIG. 8 is a flowchart showing a procedure of processing in which the information processing terminal 200 gives an expression of a secular change to an icon 1.

As shown in FIG. 8, upon generation of an icon 1 (Step 81), the CPU 15 determines whether a movement amount of the icon 1 exceeds an upper limit value (Step 82). The upper limit value also corresponds to a certain period of time such as 90 days, 120 days, 180 days, 360 days or the like, as in the first embodiment. Further, the degree of a secular change, that is, a plurality of levels of depression of the icon 1 are set and images of the icon 1 corresponding to the levels are prepared. In other words, as a non-access period to the icon 1 is longer, that icon 1 is moved toward the deep side of the display 11 and the size thereof is two-dimensionally reduced. The flash memory 19 or the like stores a plurality of three-dimensional images of the icon 1 corresponding to the levels.

In the case where a movement amount of the icon 1 does not exceed the upper limit value (No) in Step 82 described above, the CPU 15 determines whether a non-access period to the icon 1 exceeds a time T (Step 84).

When determining that a non-access period exceeds a time T (Yes), the CPU 15 moves the icon 1 toward the deep side by a distance (Step 85). Actually, the CPU 15 replaces a three-dimensional image of the icon 1 with a three-dimensional image thereof in the next level corresponding to a case where the icon 1 is moved by the distance.

Subsequently, the CPU 15 updates the time T by a time t (T=T+t), and repeats the processing in Step 82 and subsequent steps. The times T and t are set similarly to the first embodiment described above.

Then, when determining that a movement amount of the icon 1 exceeds the upper limit value in Step 82 described above, (Yes), the CPU 15 deletes the icon 1 from the display 11 (Step 83). The CPU 15 executes the processing described above with respect to each icon displayed on the display 11.

Figure 9:
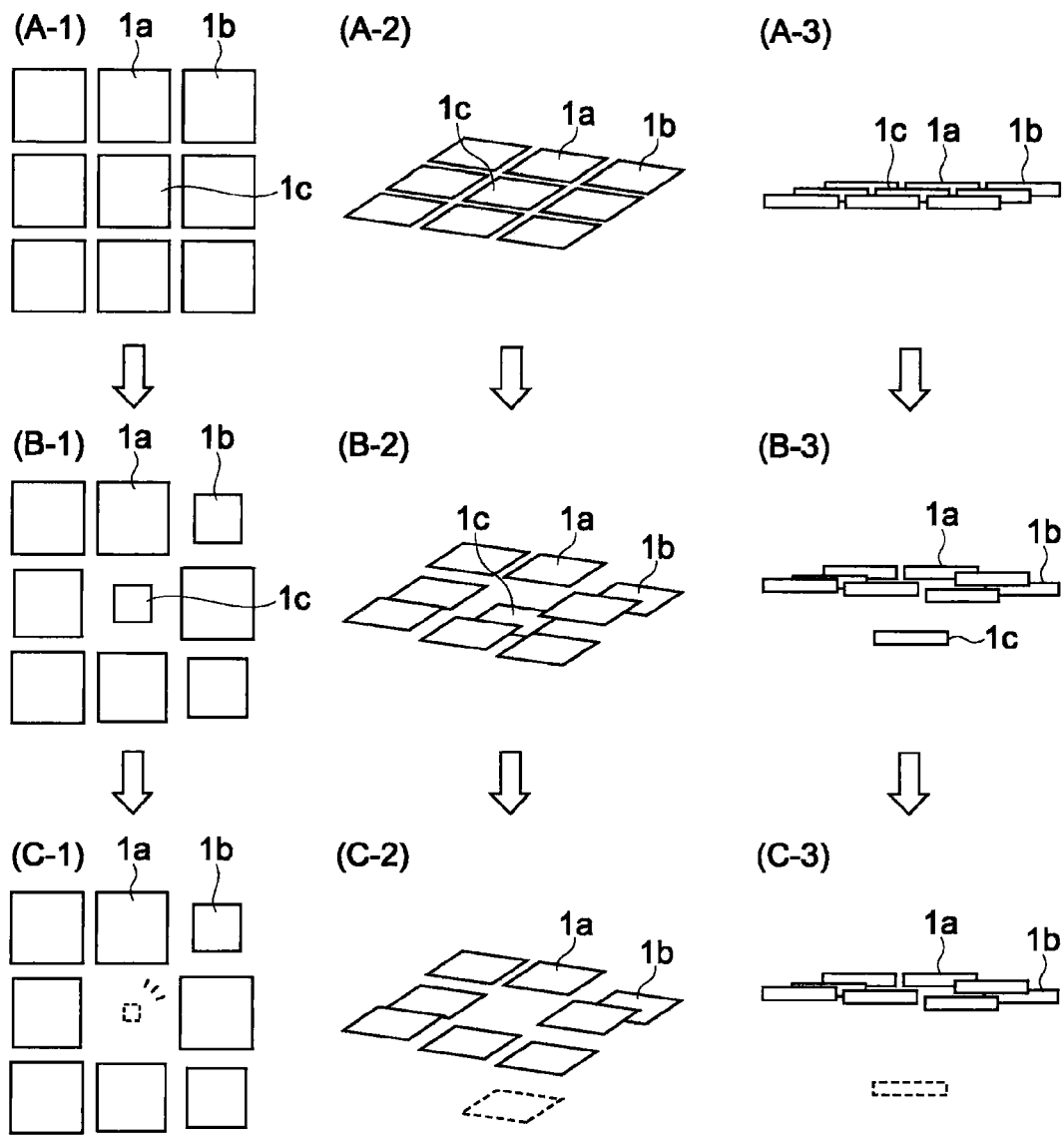
FIG. 9 is a diagram showing a state of a secular change of an icon in the second embodiment of the present disclosure.

FIG. 9 is a diagram showing a state of a secular change of an icon in this embodiment. Parts (A-1), (B-1), and (C-1) of FIG. 9 are each a view of icons 1 seen in a planar direction (plan view). Parts (A-2), (B-2), and (C-2) of FIG. 9 are each a view of icons 1 seen in an obliquely upward direction (oblique view). Parts (A-3), (B-3), and (C-3) of FIG. 9 are each a view of icons 1 seen in a side (slightly obliquely upward) direction (side view).

In this embodiment, the information processing terminal 200 can display view on the display 11 while switching the plan view and the side view. The oblique view is shown for easy understanding of the description of this embodiment for convenience. However, the information processing terminal 200 may display the oblique view. A default view is set to a plan view, for example, and a content activation operation via an icon 1 is executed on the plan view. When a user inclines (rotates) the information processing terminal 200 by an angle or more about an axis of a horizontal direction of the display 11 in a state where the plan view is displayed, for example, the sensor 20 detects the inclination and outputs the inclination to the CPU 15, and accordingly the CPU 15 controls the display 11 to switch the plan view to the side view in accordance with the inclination. When the information processing terminal 200 is inclined in the opposite direction, the view is switched to the plan view again.

Parts (A-1), (A-2), and (A-3) of FIG. 9 each show an initial state of an icon 1 in each view. Based on the initial state, the icon 1 is moved to a deep-side direction of the plan view (downward in oblique view and side view) in accordance with, for example, a non-access period to the icon 1. When a movement amount of the icon 1 exceeds the upper limit value, the icon 1 is deleted from the display 11.

For example, as shown in parts (B-1), (B-2), and (B-3) of FIG. 9, an icon 1b is moved slightly downwardly and an icon 1c is moved more downwardly, as compared to the other icons such as an icon 1a. As shown in parts (C-1), (C-2), and (C-3) of FIG. 9, when the non-access period to the icon 1c further continues and a movement amount thereof exceeds the upper limit value, the icon 1c is deleted.

In this manner, a secular change of an icon 1 is expressed by a depression of the icon 1. Accordingly, from the viewpoint of the user, an icon that has not been accessed for a long period of time seems to be depressed by the gravity, with the result that a non-access period is intuitively understood.

Processing of Deleting Expression of Secular Change

Also in this embodiment, the information processing terminal 200 can delete the expression of the secular change given to the icon 1 as in the first embodiment described above. There are two cases where the expression is deleted as in the first embodiment. In other words, one case is that a user has performed a content activation operation (for example, tap operation or double tap operation) via an icon 1, and the other case is that a user has performed a drag operation on an icon 1 without activating a content. Hereinafter, processing of those two cases will be described.

Figure 10:
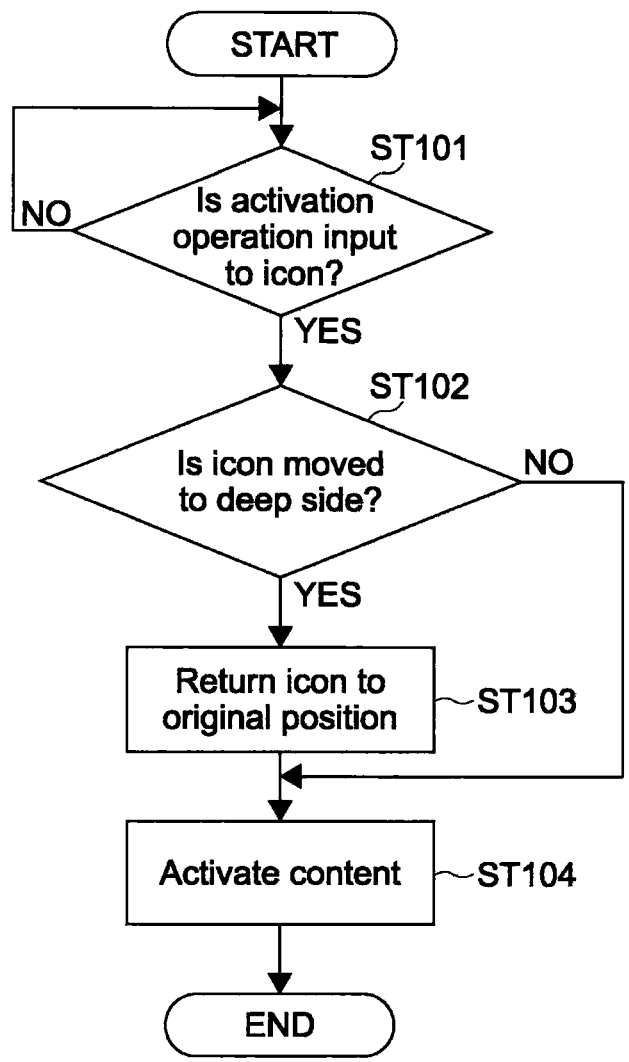
FIG. 10 is a flowchart showing a procedure of processing in which the information processing terminal according to the second embodiment of the present disclosure deletes the expression of the secular change in accordance with a content activation operation via an icon.

FIG. 10 is a flowchart showing a procedure of processing in which the information processing terminal 200 returns a depressed icon 1 to an initial position in accordance with a content activation operation via an icon 1.

As shown in FIG. 10, the CPU 15 first determines whether an activation operation is input to the icon 1 (Step 101). In the case where the activation operation is input (Yes in Step 101), the CPU 15 determines whether the icon 1 as a target of the activation operation is moved toward the deep side (downward) (Step 102).

When determining that the icon 1 is moved to the deep side (Yes in Step 102), the CPU 15 returns the icon 1 to the initial position (Step 103). In other words, the CPU 15 replaces a three-dimensional image corresponding to the icon 1 moved to the deep side with a three-dimensional image corresponding to the initial position of the icon 1. Accordingly, the non-access period is reset and recalculated based on the initial position. Then, the CPU 15 activates a content corresponding to the icon 1 (Step 104). In the case where the icon 1 is not moved to the deep side (remains at the initial position) (No in Step 102), the CPU 15 activates a content without performing processing on the icon 1 (Step 104).

Figure 11:
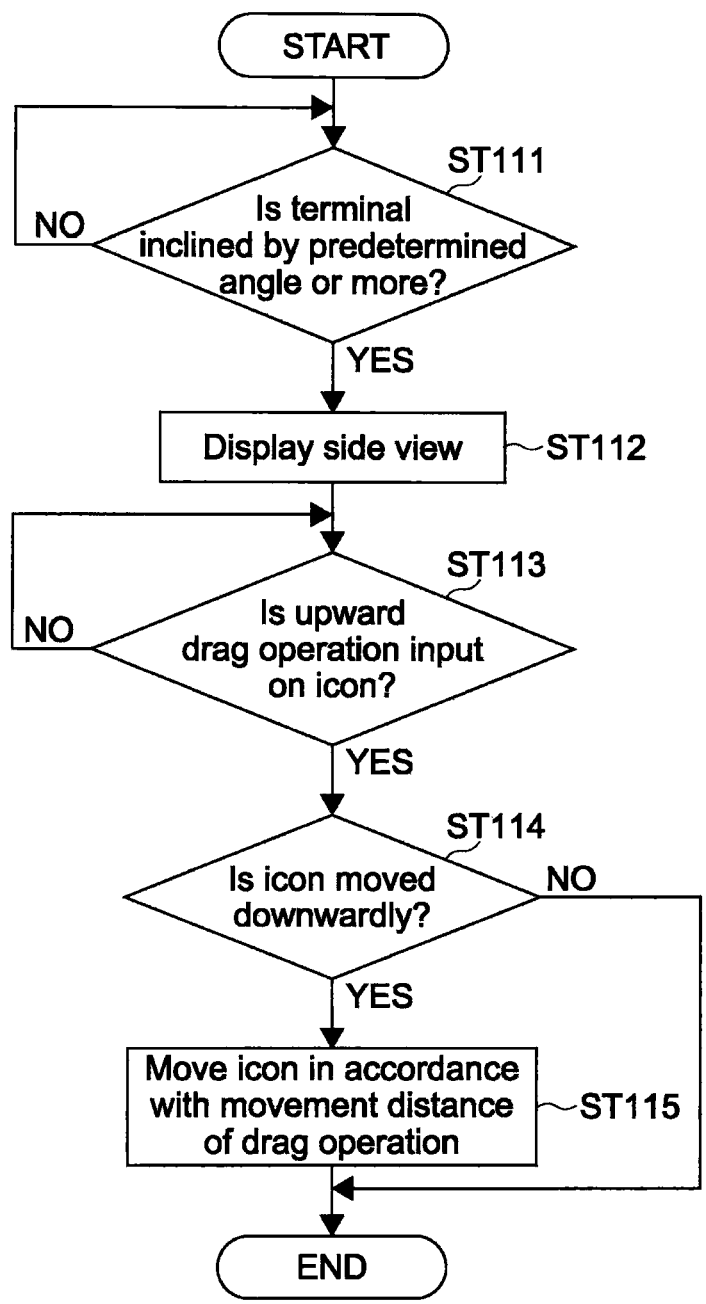
FIG. 11 is a flowchart showing a procedure of processing in which the information processing terminal according to the second embodiment of the present disclosure deletes the expression of the secular change not in accordance with a content activation operation, but in accordance with a drag operation to an icon.
Figure 12:
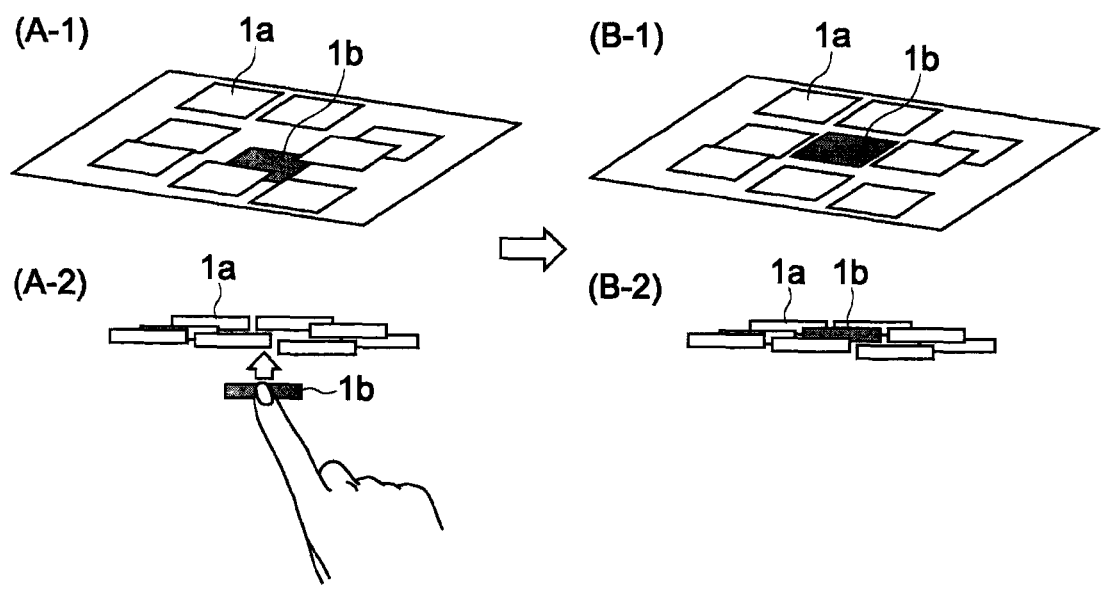
FIG. 12 is a diagram showing a state where the information processing terminal according to the second embodiment of the present disclosure deletes the expression of the secular change in accordance with a drag operation to an icon.

FIG. 11 is a flowchart showing a procedure of processing in which the information processing terminal 200 returns the icon 1 to an initial position not in accordance with a content activation operation, but in accordance with a drag operation to an icon 1. Further, FIG. 12 is a diagram showing a state where the icon 1 is returned to the initial position in accordance with the drag operation to the icon 1.

As shown in FIG. 11, the CPU 15 first determines whether the information processing terminal 200 is inclined by an angle or more from the state where the plan view is displayed (Step 111). When determining that the information processing terminal 200 is inclined by an angle or more (Yes), the CPU 15 displays the side view (Step 112).

Subsequently, the CPU 15 determines whether an upward drag operation is input on the icon 1 in the side view (Step 113). The drag operation is recognized by the user as an operation of pushing up the icon 1 that has been moved downwardly.

In the case where the drag operation is performed (Yes in Step 113), the CPU 15 determines whether the icon 1 as a target of the drag operation is moved downwardly (Step 114).

In the case where the icon 1 is moved downwardly (Yes in Step 114), the CPU 15 moves the icon 1 upwardly in accordance with a movement distance of a finger in the drag operation (Step 115).

Parts (A-1) and (A-2) of FIG. 12 are an oblique view and a side view before the drag operation is performed, respectively, and parts (B-1) and (B-2) thereof are the oblique view and the side view after the drag operation is performed, respectively. In the examples of FIG. 12, by a user's drag operation of pushing up an icon 1b that has been moved downwardly, the icon 1b is returned to the same position as the initial position of the icon 1a or the like. In the case where the user drags the icon 1 partway, not to the initial position, the icon 1 is returned to a position corresponding thereto.

When the icon 1 is upwardly moved on the side view and then the side view is switched to the plan view, the CPU 15 replaces a three-dimensional image of the icon 1 with a three-dimensional image in another level and displays the three-dimensional image in accordance with the upward movement distance. Accordingly, the icon 1 is displayed on a nearer side than the position before the drag operation is performed.

As described above, since the information processing terminal 200 can return the position of the depressed icon 1 by a distance corresponding to the movement distance of the drag operation, by adjusting a movement distance by the drag operation in accordance with a period of time during which the user wants to leave the icon 1, the user can adjust a period of time that elapses before the icon 1 is deleted.

Summary

As described above, according to this embodiment, the information processing terminal 200 expresses the secular change of the icon 1 as a depression corresponding to the non-access period to the icon 1, and accordingly can allow the user to easily grasp an icon 1 frequently accessed and other icons 1 based on the movement amount. Further, the information processing terminal can upwardly move the depressed icon 1 in accordance with a user's drag operation of pushing up the icon 1, without activating a content corresponding to the icon 1. In addition, since the upward movement can be partially performed in accordance with the movement distance of a finger in the drag operation, the user can adjust a period of time that elapses before the icon 1 is deleted.

Modified Example

The present disclosure is not limited to the embodiments described above, and can be variously modified without departing from the gist of the present disclosure.

In the embodiments described above, the expression of the secular change is cancelled when the drag operation is input to an icon 1. However, for example, the expression of the secular change may be cancelled in accordance with other operations such as a flick operation.

Further, in the first embodiment, a dirt image is deleted by a drag operation of wiping away dirt. For example, a dirt image may be deleted in the case where audio of blowing a breath is input from the microphone 17, for example, such that the user blows a breath to an icon 1 to blow off the dirt. Further, a dirt image may be deleted in the case where tap operations are input several times around the icon 1 such that dirt is removed by beating a surrounding area of the icon 1.

In the embodiments descried above, when a drag operation for canceling the expression of the secular change of an icon is input, the expression of the secular change is partially cancelled in accordance with the number of drag operations, a pressing force, a contact area, a movement distance, or the like. However, in the case where such a drag operation is input even once, the information processing terminal may cancel all expressions of the secular change irrespective of the pressing force, the contact area, the movement distance, or the like and return the icon to the initial state.

In the embodiments described above, the secular change of the icon 1 is expressed by the dirt accumulated on the icon 1 and the depression of the icon 1, but the expression of the secular change is not limited thereto.

For example, assuming the icon 1 to be paper, image processing may be executed in which an icon 1 curls at the edge in accordance with a non-access period to the icon 1, like old paper gradually curling at the edge. In this case, images of the icon 1 in several levels corresponding to degrees of curl are prepared and replaced in accordance with the non-access period. Further, for example, in the case where a drag operation of holding and stretching the curled edge of the icon 1 is input, the curl is cancelled.

Further, for the secular change of the icon 1, image processing in which the icon 1 is gradually frozen may be executed. Also in this case, images of the icon 1 in several levels corresponding to degrees of freeze are prepared and replaced in accordance with the non-access period. Further, for example, in the case where a long touch operation such as melting a frozen icon 1 by temperature of a finger is input, the freeze of the icon 1 is cancelled.

In the embodiments described above, each content has a constant degree or speed of the secular change of the icon 1, but the degree or speed of the secular change may be variable depending on types of contents. For example, a variable degree or speed of the secular change may be achieved as follows. Metadata indicating a type of a content and a speed of a secular change corresponding thereto may be stored in the flash memory 19 or the like, and the CPU 15 may vary values of the times T and t in accordance with the metadata. In this case, for example, files activated only in a specific period of time (for example, file associated with event on specific date, file having expiration date, etc.) may be changed with time quickly. Further, the user may designate a degree of a secular change depending on each type of a content.

In the embodiments described above, an expression of a secular change is given to the icon 1 without exception when a non-access period exists. However, an expression of a secular change may not be given to an icon 1 of a specific content, which is achieved by storing metadata of the specific content, the metadata indicating that an expression of a secular change is not given. For example, in the case where a content is a photograph, a user does not browse the photograph frequently but wants to browse the photograph sometimes to bring back the past. Therefore, the expression of a secular change may not be given to the photograph.

Further, an icon 1 to be prevented from being changed with time may be designated by the user. In this case, for example, any configuration may be adopted in the first embodiment, in which an area where dirt is not accumulated on an icon 1 how much time elapses (for example, area with roof) is prepared and a user drags the specific icon 1 to the area. Further, in the second embodiment, an area where an icon 1 is not depressed (for example, area like shelf) may be similarly prepared and a user may drag the icon 1 to the area.

In the embodiments described above, the processing of the icon 1 displayed in a list as an initial menu screen on the display 11 has been described, but similar processing may be executed with respect to icons other than the icon 1. For example, in the case where a music reproduction application has functions of extracting a reproduction tendency from user's preference or operation histories and automatically setting track reproduction priority, and a secular change is given to an icon of a content less frequently reproduced, the track reproduction priority may be raised by processing of canceling the expression of the secular change.

In the embodiments described above, the information processing terminal includes a touch panel and an operation to the icon is made by a user's finger. However, the information processing terminal may not include a touch panel and receive an input of an operation to an icon with use of an input apparatus such as a mouse. In this case, the operation made by the user's finger described above (drag operation) may be replaced with an operation made using a mouse and a pointer, but in the first embodiment, for example, a tool such as a dustcloth used for wiping away dirt may be prepared as a user interface.

In the embodiments described above, the expression of a secular change is given to an icon, but a target to which the expression of the secular change is given is not limited to the icon. For example, in an in-box and out-box of an e-mail client, the expression of a secular change may be given to item columns of e-mail files displayed in a list. In this case, when a user has e-mail files that the user wants to leave as memorandum books though not browsing, the processing of canceling the expression of the secular change may be executed for the items of the files.

In the embodiments described above, the information processing terminal (smartphone) has been exemplified as an information processing apparatus. However, the present disclosure is applicable to, for example, a desktop PC (Personal Computer), a laptop PC, or a tablet PC, a mobile phone, a television apparatus, a digital still camera, a digital video camera, a recording reproducing apparatus, a game console, a PDA (Personal Digital Assistants), an electronic book terminal, an electronic dictionary, a portable audio/video player, a car navigation apparatus, and other information processing apparatuses.

The present disclosure contains subject matter related to that disclosed in Japanese Priority Patent Application JP 2010-228380 filed in the Japan Patent Office on Oct. 8, 2010, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An apparatus comprising:
a first detection unit configured to detect a first user operation on a first object;
a first display unit configured to generate signals to display the first object in a first display state when the first user operation is detected on the first object;
a second display unit configured to generate signals to change the display state of the first object from the first display state to a second display state at a first amount of time after the first user operation is detected on the first object, the second display state comprising a visual indication of the elapse of the first amount of time;
a second detection unit configured to detect a second user operation on the first object, the second user operation being different from the first user operation; and
a third display unit configured to generate signals to change the display state of the first object from the second display state to the first display state in response to the detection of the second user operation on the first object.

2. The apparatus of claim 1, wherein the first, second and third display units are the same display unit and the first and second detection units are the same detection unit.

3. The apparatus of claim 1, wherein the first user operation comprises at least one of a tap, a click, a double tap, a double click, a drag, or a non-click activation command.

4. The apparatus of claim 1, wherein the second display unit is further configured to:
generate signals to change the display state of the first object from the second display state to a third display state after a second amount of time, the third display state comprising deleting the first object from view and the second amount of time being longer than the first amount of time.

5. The apparatus of claim 1, wherein the second display unit is further configured to:
generate signals to change the display state of the first object from the second display state to a third display state after a second amount of time, the third display state comprising a visual indication of the elapse of the second amount of time and the second amount of time being longer than the first amount of time.

6. The apparatus of claim 5, wherein:
the apparatus further comprises a third detection unit configured to detect a third user operation on the first object, the third user operation being different from the first and second user operations and comprising at least one of a click operation, a drag operation, an operation comprising pressing with a threshold amount of force, an operation comprising pressing with a threshold contact area, or combinations of operations comprising any of the preceding operations; and
the second display unit is further configured to generate signals to change the display state of the first object from the third display state to the second display state when the third user operation is detected on the first object.

7. The apparatus of claim 1, wherein the second display state comprises dividing the first object into at least first and second portions, the second portion comprising the visual indication of the elapse of the first amount of time.

8. The apparatus of claim 1, wherein the visual indication of the elapse of the first amount of time comprises obscuring at least a portion of the first object from view.

9. The apparatus of claim 1, wherein the visual indication of the elapse of the first amount of time comprises displaying the first object to appear depressed compared with the appearance of the first object in the first display state.

10. The apparatus of claim 9, wherein:
the apparatus further comprises a third detection unit configured to detect when the apparatus is inclined by more than an incline amount; and
the first and second display states further comprise at least a partial side display of the first object when the incline amount is detected.

11. The apparatus of claim 10, wherein the second user operation comprises an upward drag input on the first object.

12. The apparatus of claim 1, wherein the second user operation comprises at least one of a click operation, a drag operation, an operation comprising pressing with a threshold amount of force, an operation comprising pressing with a threshold contact area, or a combination of operations comprising any of the preceding operations.

13. The apparatus of claim 1, wherein:
the first detection unit is further configured to detect the first user operation on a second object;
the first display unit is further configured to generate signals to display the second object in the first display state when the first user operation is detected on the second object;
the second display unit is further configured to change the display state of the second object from the first display state to a fourth display state at a second amount of time after the first user operation is detected on the second object, the second amount of time being different from the first amount of time;
the second detection unit is further configured to detect the second user operation on the second object; and
the third display unit is further configured to change the display state of the second object from the fourth display state to the first display state when the second user operation is detected on the second object.

14. The apparatus of claim 1, further comprising a second object and wherein the first display unit is further configured to generate signals to display the second object in a fourth display state whether or not the second object is subjected to the first user operation.

15. The apparatus of claim 14, wherein the second object is the first object after having been selected by a user.

16. The apparatus of claim 15, wherein the selection occurs when the user moves the first object to a display area.

17. The apparatus of claim 14, wherein the second amount of time is determined according to at least one of an application associated with the second object or a content type associated with the second object.

18. The apparatus of claim 17, wherein the determination of the second amount of time is based at least in part on an evaluation of at least one of a user preference or operation history with respect to the application.

19. A method comprising:
displaying a first object in a first display state when the displayed first object is subjected to a first user operation on the first object;
changing the display state of the first object from the first display state to a second display state at a first amount of time after the first user operation, the second display state comprising a visual indication of the elapse of the first amount of time; and changing the display state of the object from the second display state to the first display state in response to a second user operation on the first object different from the first user operation.

20. A tangibly embodied non-transitory computer-readable medium storing instructions which, when executed by a processor, perform a method comprising:

displaying a first object in a first display state when the displayed first object is subjected to a first user operation on the first object;

changing the display state of the first object from the first display state to a second display state at a first amount of time after the first user operation, the second display state comprising a visual indication of the elapse of the first amount of time; and changing the display state of the object from the second display state to the first display state in response to a second user operation on the first object different from the first user operation.

\* \* \* \* \*